M. C. SHARPNACK.
HOSE COUPLING.
APPLICATION FILED APR. 2, 1918.

1,339,141.

Patented May 4, 1920.

INVENTOR
Matthew C. Sharpnack

WITNESSES
W. C. Fielding
H. G. Peisar

BY
Richard Owen.

ATTORNEY

UNITED STATES PATENT OFFICE.

MATTHEW C. SHARPNACK, OF JAMISON, NEBRASKA.

HOSE-COUPLING.

1,339,141.  Specification of Letters Patent.  Patented May 4, 1920.

Application filed April 2, 1918. Serial No. 226,257.

*To all whom it may concern:*

Be it known that I, MATTHEW C. SHARPNACK, a citizen of the United States, residing at Jamison, in the county of Keyapaha and State of Nebraska, have invented certain new and useful Improvements in Hose-Couplings, of which the following is a specification.

This invention is a hose coupling, more particularly adapted for employment where it is desired to connect a rubber hose to a street outlet or to a faucet having a threaded hose connection end.

One object of the invention is to provide a coupling that will consist of few parts, strong and rigid in construction, one that will be effective to couple and provide a fluid tight joint between the coupled conduits, one that is simple to use and one that will be cheap to manufacture.

Another object of the invention is to provide a coupling having a female member interiorly threaded at one end and adjacent its opposite end provided with a socket for receiving a male member having a flange, one lateral face of which tapers so that its shape will conform to the configuration of the socket.

A further object of the invention is to provide a female member of a hose coupling with a threaded gasket having one end adapted for contact with the threaded end of the water outlet and its opposite end tapered and adapted to be forced into engagement with the flat end of the male member by having one portion of the interior walls of the female member tapered.

Broadly stated the invention comprises male and female members adapted to be coöperatively connected together to form a water tight joint, the female member being provided at one end with internal threads and adjacent the opposite end with a socket having a rounded bottom wall and substantially parallel edge walls, one of the side walls of said socket converging toward the passage wall from top to bottom, the bore of said female member between the end of the threads and the socket being tapered inwardly, the male member being provided at one end with a flange having a configuration to conform to the shape of the socket, and a gasket formed as a sleeve and adapted to be threadedly engaged within the female member, said gasket having its outer end tapered for engagement with the tapered portion of the bore so that its extreme outer end will be turned inward toward the bore and be forced into engagement with the flat end of the flange on the male member, and means for retaining the two members in their coöperative relation.

One practical form of construction and assembly will be described and illustrated in the accompanying drawings, in which:—

Figure 1:
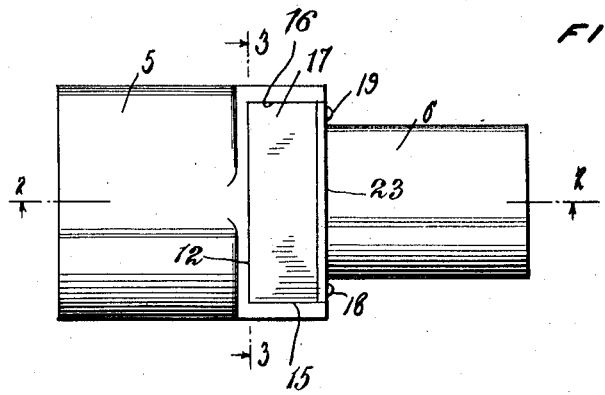
Figure 1 is a top plan view of the hose coupling.
Figure 2:
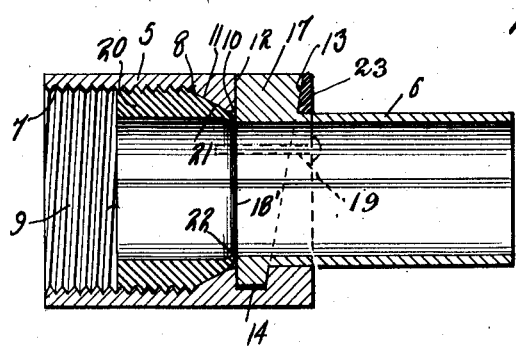
Fig. 2 is a sectional view on the line 2—2 of Fig. 1.

In the preferred embodiment the hose coupling comprises two members that will be designated respectively the female member 5 and the male member 6. The female member 5 is provided interiorly with the threads 7 so that it may be connected with a water outlet or other threaded connections.

The threads 7 do not extend throughout the length of the female member but terminate at a point 8. From the point 8 the interior walls of the female member taper inwardly toward the bore 9 to a point 10, the inclined wall being indicated at 11. This end of the female member is provided with a socket having a straight wall 12 that lies adjacent the point 10. The passage walls 13 of the socket tapers or converges downwardly from the upper end to the bottom wall indicated at 14.

Figure 3:
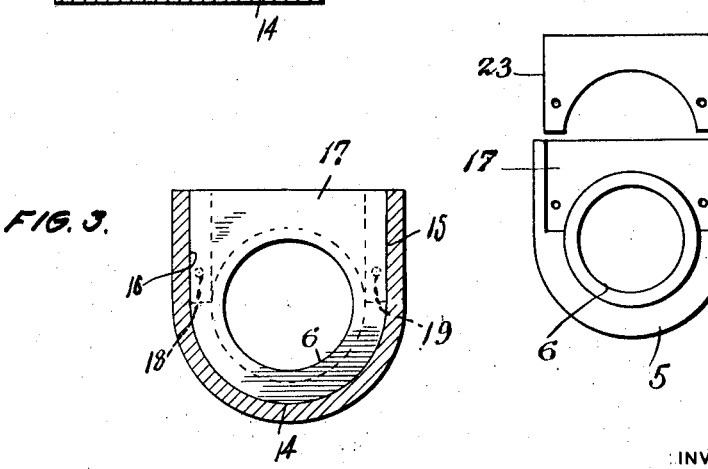
Fig. 3 is a sectional view on the line 3—3 of Fig. 1.

The bottom wall 14 is preferably rounded as more particularly shown in Fig. 3 and the edge walls 15 and 16 spring therefrom upward and are approximately parallel to each other. The opening at the top of the socket is approximately rectangular as shown more particularly in Fig. 1. The male member 6 is provided at its outer end with a flange 17 that has its forward wall 18′ substantially straight to correspond with the straight wall 12 of the socket. Its remaining outline is one that will adapt it to fit in close contact with the walls 15 and 16 and be approximately in contact with the bottom wall 14. If desired the rounded end of the flange 17 may be in actual contact with the rounded bottom wall 14 of the socket. The shape of the flange 17 as shown in Fig. 1 is approximately rectangular in order that the opening of the socket may be completely closed.

Figure 4:
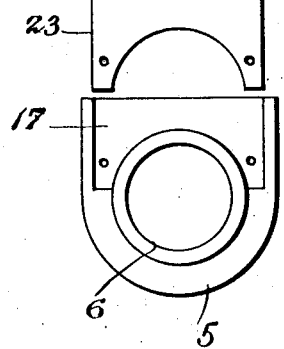
Fig. 4 is a rear view of the coupling, with the securing plate detached as illustrated in elevated position.

In order to maintain the two members in their coöperative relation and engagement suitable fastening means may be employed such as a confining plate 23. This confining plate is shown most clearly in Fig. 4 and has its lower edge cut away to fit closely about the upper portion of the member 6 and when in position the confining plate is made secure by the fastenings 18 and 19. Disposed within the female member 5 there is a gasket 20 that may be formed of rubber or of other suitable material. This gasket is provided with threads that are adapted to coöperate with the threads 7.

The forward end of the gasket 20 is tapered as indicated at 21 and this taper may be greater or lesser than the taper of the inclined wall 11 between the points 8 and 10. The differences in the tapers between that of the gasket 20 and the inclined wall 11 is such that the forward edge 22 of the gasket is slightly turned in toward the longitudinal axis of the coupling.

The edge 22 is thus in very close contact with the straight wall 12 of the flange 17. Water passing through the coupling and under pressure will tend to force this edge 22 into a more intimate contact and thus provide a better joint between the straight wall 12 of the flange and the straight wall of the socket.

The rear end of the gasket 20 is substantially parallel in order that it may come into abutting relation with any threaded fluid outlet. The entering movement of that member will tend to force the edge 22 forward.

What is claimed is:

1. A hose coupling, which comprises female and male members, adapted to be coöperatively connected together to form a water-tight joint, the female member being provided adjacent one end with a socket having tapered walls, the male member being provided with a flange having a varying thickness and adapted to be seated in the socket of the female member, the female member being threaded interiorly and provided with tapering walls adjacent the socket, a threaded gasket adapted to engage with the threads of the member, and having its forward end portion tapered, said end being adapted to be forced into engagement with the end of the male member to form a water-tight joint, and means to secure the members together.

2. A hose coupling, which comprises a male and female member adapted to be coöperatively connected together, means for retaining the members in a connected relation, said female member being provided at its outer end with a socket having a rounded bottom wall and its side walls converging from top to bottom, the edge walls being substantially parallel upward from the point where they join the rounded bottom wall, the upper end of said socket being approximately rectangular, the male member consisting of a nipple portion having at one end a flange that is formed for a seating engagement with the walls of the socket of the female member, the end of said flange lying flush with the upper ends of the walls of the socket, and removable elastic means disposed in the bore of the female member and adapted to have its outer end curve inwardly and against the flat face of the flange of the male member when said flange is engaged in the socket of the female member.

In testimony whereof I affix my signature in presence of two witnesses.

MATTHEW C. SHARPNACK.

Witnesses:
G. F. CADY,
J. FRED WISEMILLER.